United States Patent
Cappelle et al.

(10) Patent No.: US 12,194,655 B2
(45) Date of Patent: Jan. 14, 2025

(54) METHOD FOR MANUFACTURING A FOLDED PANEL, AND A FOLDED PANEL

(71) Applicant: FLOORING INDUSTRIES LIMITED, SARL, Bertrange (LU)

(72) Inventors: Mark Cappelle, Staden (BE); Christophe Naeyaert, Jabbeke (BE); Ewan Demaegdt, Assebroek (BE)

(73) Assignee: UNILIN BV, Wielsbeke (BE)

( * ) Notice: Subject to any disclaimer, the term of this patent is extended or adjusted under 35 U.S.C. 154(b) by 267 days.

(21) Appl. No.: 17/778,145

(22) PCT Filed: Nov. 10, 2020

(86) PCT No.: PCT/IB2020/060556
§ 371 (c)(1),
(2) Date: May 19, 2022

(87) PCT Pub. No.: WO2021/099886
PCT Pub. Date: May 27, 2021

(65) Prior Publication Data
US 2023/0001604 A1   Jan. 5, 2023

(30) Foreign Application Priority Data
Nov. 20, 2019  (BE) .................................. 2019/5808

(51) Int. Cl.
*B27H 1/00*   (2006.01)
*B27G 11/00*   (2006.01)
(Continued)

(52) U.S. Cl.
CPC ............... *B27H 1/00* (2013.01); *B27G 11/00* (2013.01); *B27M 3/12* (2013.01); *B32B 3/30* (2013.01);
(Continued)

(58) Field of Classification Search
CPC .  B27M 3/04; B27M 3/08; B27M 3/12; B27D 5/00; B27D 5/006; B27F 5/00; B27F 5/02; B27H 1/00
See application file for complete search history.

(56) References Cited

U.S. PATENT DOCUMENTS

| | | | | |
|---|---|---|---|---|
| 5,688,351 A | * | 11/1997 | Thomas | ................... B27D 1/08 |
| | | | | 144/349 |
| 10,974,414 B2 | * | 4/2021 | Kato | ....................... B29C 65/48 |
| 2007/0125021 A1 | * | 6/2007 | Thiers | .................... B27D 5/003 |
| | | | | 52/592.1 |

FOREIGN PATENT DOCUMENTS

| | | |
|---|---|---|
| DE | 2606887 A1 | 8/1977 |
| DE | 102008060212 B3 | 4/2010 |

(Continued)

OTHER PUBLICATIONS

Belgian Search Report from corresponding Application No. BE201905808, Aug. 4, 2020.
(Continued)

*Primary Examiner* — Matthew Katcoff
(74) *Attorney, Agent, or Firm* — Workman Nydegger (57) ABSTRACT

A method for manufacturing a folded panel including the following steps: providing a longitudinal recess at the rear side, such that at the front side between remaining panel sections on both sides of the recess a flexible transition section remains, bending the panel sections relative to each other and applying an adhesive in the recess. Before the panel sections are bent relative to each other, a template is inserted into the recess.

7 Claims, 6 Drawing Sheets

(51) Int. Cl.

| | | |
|---|---|---|
| *B27M 3/12* | (2006.01) | |
| *B32B 3/30* | (2006.01) | |
| *B32B 38/00* | (2006.01) | |
| *E04F 15/02* | (2006.01) | |
| B27F 1/00 | (2006.01) | |
| B32B 3/06 | (2006.01) | |
| B32B 21/02 | (2006.01) | |
| B32B 21/04 | (2006.01) | |
| B32B 21/08 | (2006.01) | |
| B32B 27/18 | (2006.01) | |
| B32B 27/30 | (2006.01) | |
| B32B 27/32 | (2006.01) | |
| B32B 27/36 | (2006.01) | |
| B32B 27/40 | (2006.01) | |
| E04F 11/17 | (2006.01) | |

(52) U.S. Cl.
CPC .... *B32B 38/0012* (2013.01); *E04F 15/02177* (2013.01); *B27F 1/005* (2013.01); *B32B 3/06* (2013.01); *B32B 21/02* (2013.01); *B32B 21/04* (2013.01); *B32B 21/08* (2013.01); *B32B 27/18* (2013.01); *B32B 27/304* (2013.01); *B32B 27/32* (2013.01); *B32B 27/36* (2013.01); *B32B 27/40* (2013.01); *B32B 2250/24* (2013.01); *B32B 2264/067* (2013.01); *B32B 2307/546* (2013.01); *B32B 2317/16* (2013.01); *B32B 2323/04* (2013.01); *B32B 2327/06* (2013.01); *B32B 2367/00* (2013.01); *B32B 2375/00* (2013.01); *B32B 2607/00* (2013.01); *E04F 11/175* (2013.01); *E04F 15/02038* (2013.01); *E04F 2203/00* (2013.01)

(56) References Cited

FOREIGN PATENT DOCUMENTS

| | | | |
|---|---|---|---|
| DE | 102009036985 B4 * | 8/2012 | ............ B27F 1/005 |
| EP | 3228775 A1 | 11/2017 | |
| GB | 1451115 A1 | 9/1976 | |
| WO | 2017130114 A1 | 8/2017 | |
| WO | WO-2024153993 A1 * | 7/2024 | ............ B29C 53/04 |

OTHER PUBLICATIONS

International Search Report from corresponding Application No. PCT/IB202/060556, Mar. 1, 2021.

* cited by examiner

METHOD FOR MANUFACTURING A FOLDED PANEL, AND A FOLDED PANEL

BACKGROUND

The invention relates to a method for manufacturing a folded panel, comprising the following steps: feeding a panel with a front side and a rear side, inserting a longitudinal recess at the rear side, such that at the front side between the remaining panel sections a flexible transition section is left on both sides of the recess, bending the panel sections relative to each other to a folded condition with a desired curvature of the transition section, and applying an adhesive in the recess to fix the folded condition.

Such a method is known from WO 2017/130114. According to the known method, the panel is composed of a bearer material and a decorative top layer. The resulting folded panel is a base board. In folded condition, the transition section is supported by the adhesive that also acts as a filler.

SUMMARY

Objective of the present invention is to provide an optimized method for manufacturing a folded panel.

This objective is achieved by the method according to the present invention, wherein a template is inserted into the recess before the panel sections are folded relative to each other, which template has an end face with a shape such that the transition section in folded condition abuts the end face, and the transition section is bent over the end face when bending the panel sections, after which the template is removed and the panel folded in this manner is held in the folded condition and subsequently the adhesive is applied.

An advantage of the invention is, that the transition section is supported during the bending of the panel sections relative to each other, so that in all cases these have a predefined shape after bending. This guidance during folding minimizes the risk of breakage in the transition section. The procedure results in a folded panel, which can for instance be used as stair covering, but alternative applications are also conceivable.

Preferably, the template is shaped in such a way that outer sides of the template situated at both sides of the end face of the template in the folded condition, abut the opposite sidewalls of the panel sections at the location of the recess, because this makes it easy to realize a predefined mutual angle of the panel sections.

In a specific embodiment, the end face has a curvature with a constant radius. This means that the end face in cross-section of the template forms part of a circle.

The end face may be located on a thickened part of the template. This saves adhesive in the non-thickened section that is within the recess after the folding of the panel sections.

The template can be removed in the folded condition by sliding it in the lengthwise direction of the recess out of the recess and/or by sliding the folded panel lengthwise away from the template.

In a special embodiment, the panel is fitted with a core, wherein at the front side of the panel a top layer of material other than the core is bonded to the core, wherein the transition section at least comprises the top layer. The top layer may be a decorative layer as known in laminated panels, such as laminated floor panels. The core may for instance be HDF or MDF, but also a synthetic composite is conceivable, wherein the synthetic composite preferably comprises a thermoplastic synthetic and fillers, for instance $CaCO_3$, talcum, wood particles or grass particles. In the case of a synthetic composite, the material of the top layer preferably differs from the material of the core at least in that the material of the top layer is free of fillers, while the core comprises fillers, or at least still comprises less fillers than the core. The synthetic of the synthetic composite is preferably chosen from the group of polyvinyl chloride (PVC), polyurethane (PU), polyethylene (PE) and polyethylene terephthalate (PET). The top layer preferably contains the same synthetic as the core.

At least one pair of opposite side edges of the panel may be provided with coupling means for coupling the panel to a similar panel, wherein the recess is provided parallel to the coupling means. This allows the resulting folded panels to be coupled together, for instance for creating stair covering. The coupling means comprise for instance a tongue and groove. Preferably, the folded panels are elongated and the coupling means are at least provided along the pair of long side faces, and the recess is also provided in the longitudinal direction. It is not ruled out that the folded panels are also provided with coupling means on the opposite end faces, so those can also be coupled with the adjacent similarly folded panels. This may for instance be interesting in the event the folded panels are used to cover a broad step, that is a step broader than the length of one folded panel The invention also relates to a folded panel comprising a front side and a rear side and two panel sections of equal thickness located at an angle relative to each other, interconnected through a curved transition section at the location of the front side and thus together forming one whole, wherein the panel sections and the transition section enclose a space filled with adhesive, wherein the smallest distance between the panel sections is greater than the thickness of the transition section. When the folded panel is manufactured using a template, as in the above method, the panel sections will in all cases be located at a distance from each other.

The distance between the panel sections at the location of the transition section may be greater than at a distance from that; this typically being the case when a template is used in manufacturing, of which the end face is at a thickened part of the template.

BRIEF DESCRIPTION OF THE DRAWINGS

Below, the invention will be illustrated with the aid of drawings, which very schematically show the embodiment examples of the invention.

DETAILED DESCRIPTION OF VARIOUS EMBODIMENTS

Figure 1:
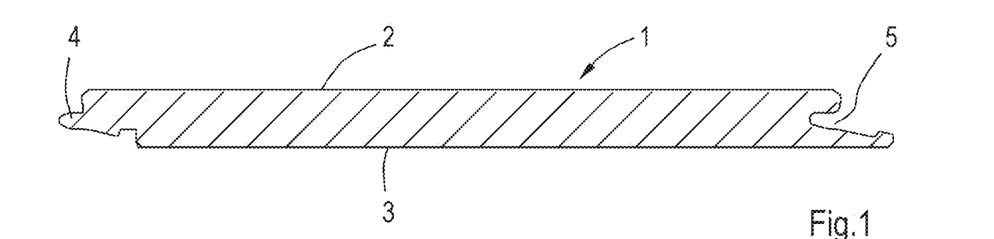
FIG. 1 is a cross-section view of a panel from which a folded panel is manufactured by a method according to the invention.

FIG. 1 shows a panel 1 with a front side 2 and a rear side 3. Panel 1 has a core on which a decorative top layer is provided at the front side 2 of the panel 1, for example by laminating. Coupling means in the form of a tongue 4 and groove 5 are provided on both sides of the panel 1. Such panels 1 are typically used as floor covering.

Figure 3:
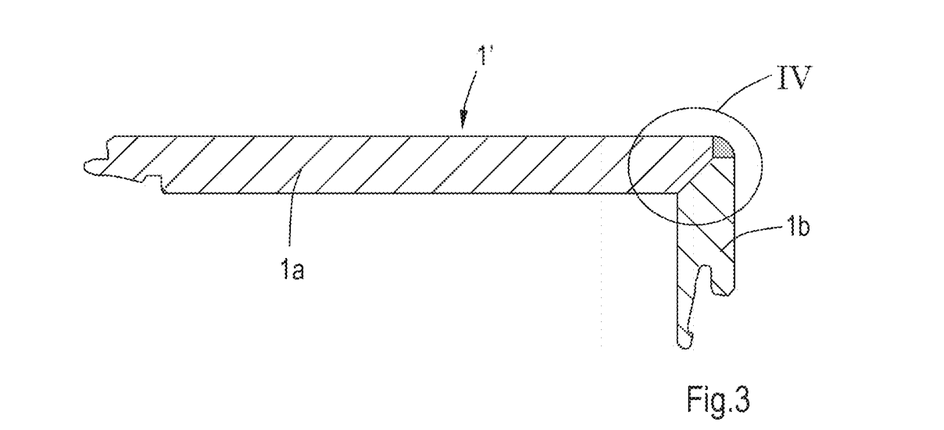
FIG. 3 is the same view as FIG. 1, wherein the resulting folded panel is shown.

The present invention is based on a method for manufacturing a folded panel 1' from the panel 1, as for instance shown in FIG. 3.

Figure 2:
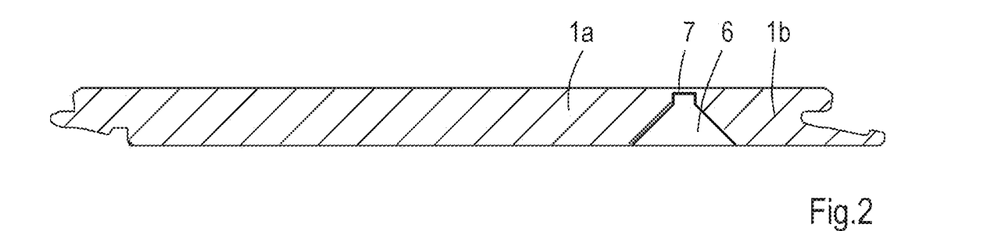
FIG. 2 is the same view as FIG. 1 after installing a recess in the panel.
Figure 4:
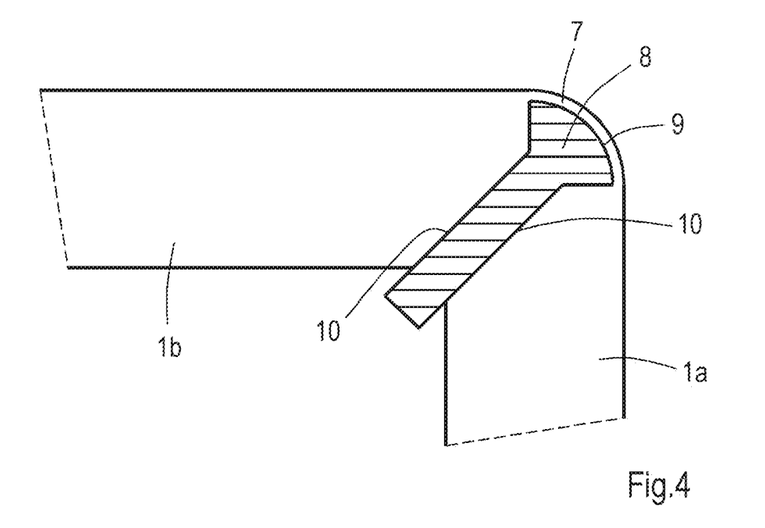
FIG. 4 is an enlarged detail of FIG. 3, which is indicated there by IV, wherein the folded condition with a template in the recess is illustrated.

FIGS. 2 and 4 illustrate steps of an embodiment of the method. FIG. 2 shows that at the rear side 3 of the panel 1 an elongated recess 6 is provided. The recess 6 is parallel to the groove 5 and the tongue 4. On both sides of the recess 6, remaining panel sections 1a, 1b have been created. In addition, at the front side 2 of the panel 1, between panel sections 1a, 1b, a flexible transition section 7 is left. Such a recess 6 can be created in the known way by means of, for example, a milling operation.

After creating the recess 6, a longitudinal die or template 8 is inserted into the recess 6. The template 8 has a curved end face 9 which is brought into contact with the transition section 7. In this case, the end face 9 has a curvature with a constant radius. The end face 9 is located on a thickened section of the template 8. After inserting the template 8 into the recess 6, the panel sections 1a, 1b are bent relative to each other to a folded condition as shown in FIGS. 3 and 4. During bending, the transition section 7 is bent over the end face 9. FIG. 4 shows that the end face 9 in the folded condition abuts the transition section 7. The template 8 has outer sides 10 on both sides of the end face 9, which in the folded condition are adjacent to opposite side faces of the panel sections 1a, 1b.

Figure 9:
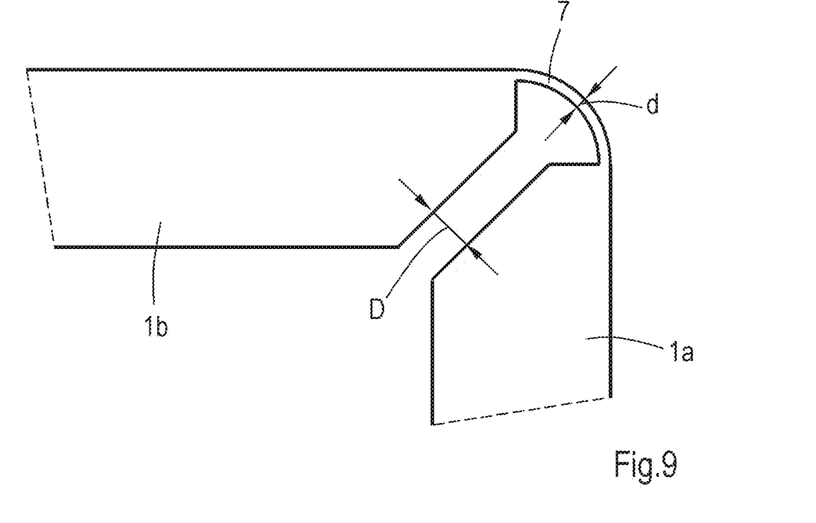
FIG. 9 is the same view as FIG. 4, wherein the template has been removed from the recess.

The panel sections 1a, 1b are held in the folded condition of, after which the template 8 is slid lengthwise from the recess 6 out of the panel 1. Subsequently, the adhesive is inserted into the created space to fix the folded condition. As a result of the use of the template 8, at the folded panel 1' there will in all cases be a distance between the panel sections 1a, 1b, but the smallest distance between the panel sections 1a, 1b is greater than the thickness of the transition section 7. In FIG. 9, showing the folded panel 1' without template 8 and without adhesive, the smallest distance between the panel sections 1a, 1b is indicated by the upper case letter D and the thickness of the transition section 7 by the lower case letter d.

Figure 5:
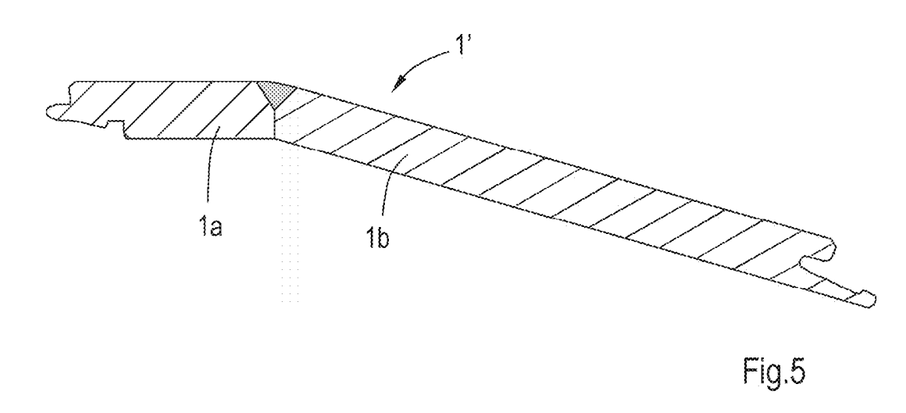
FIG. 5 is the same view as FIG. 3, but wherein the folded panel has a different shape in the folded condition.

In FIGS. 3 and 4, the panel sections 1a, 1b in the folded condition of the folded panel 1' are perpendicular to each other, but many alternative angles are possible. FIG. 5 shows, for instance, that the panel sections 1a, 1b are at an angle of approximately 15°.

Figure 6:
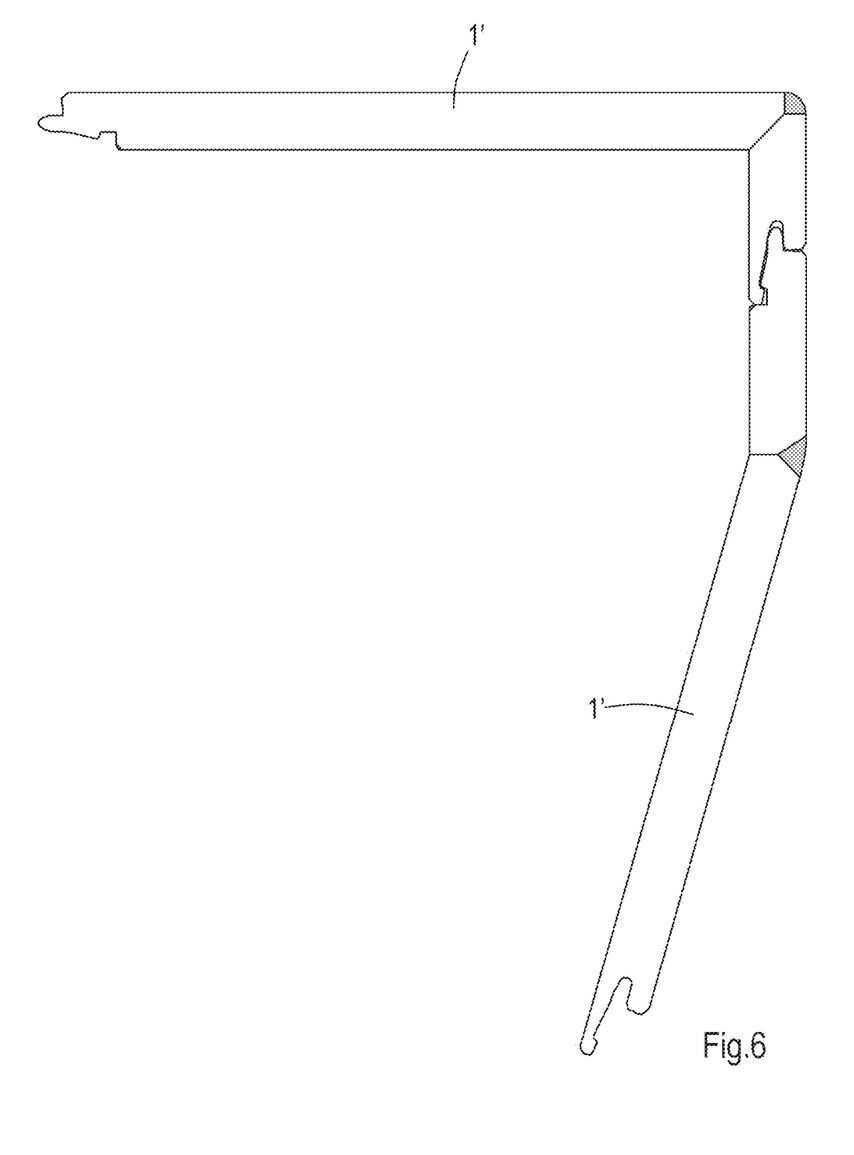
FIG. 6-8 are cross-sectional views of versions of stair covering using panels and folded panels, as shown in FIGS. 1, 3 and 5.
Figure 7:
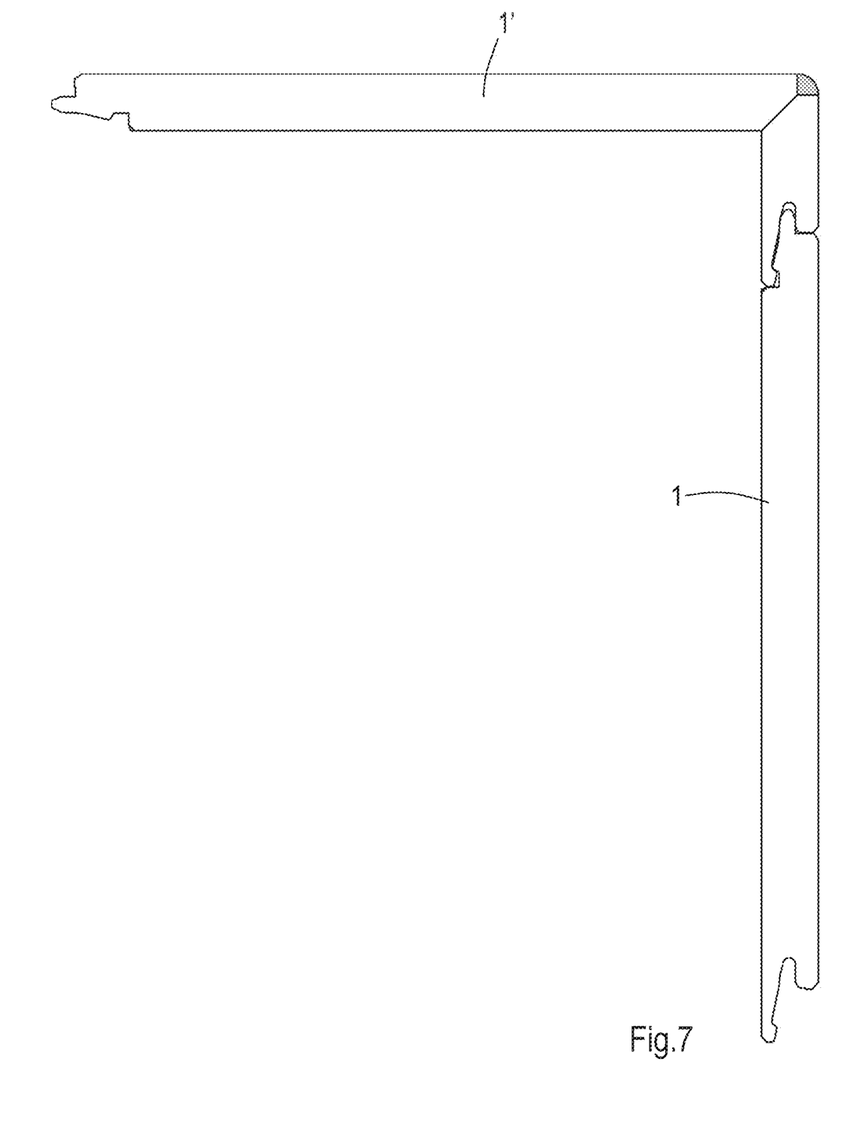
Figure 8:
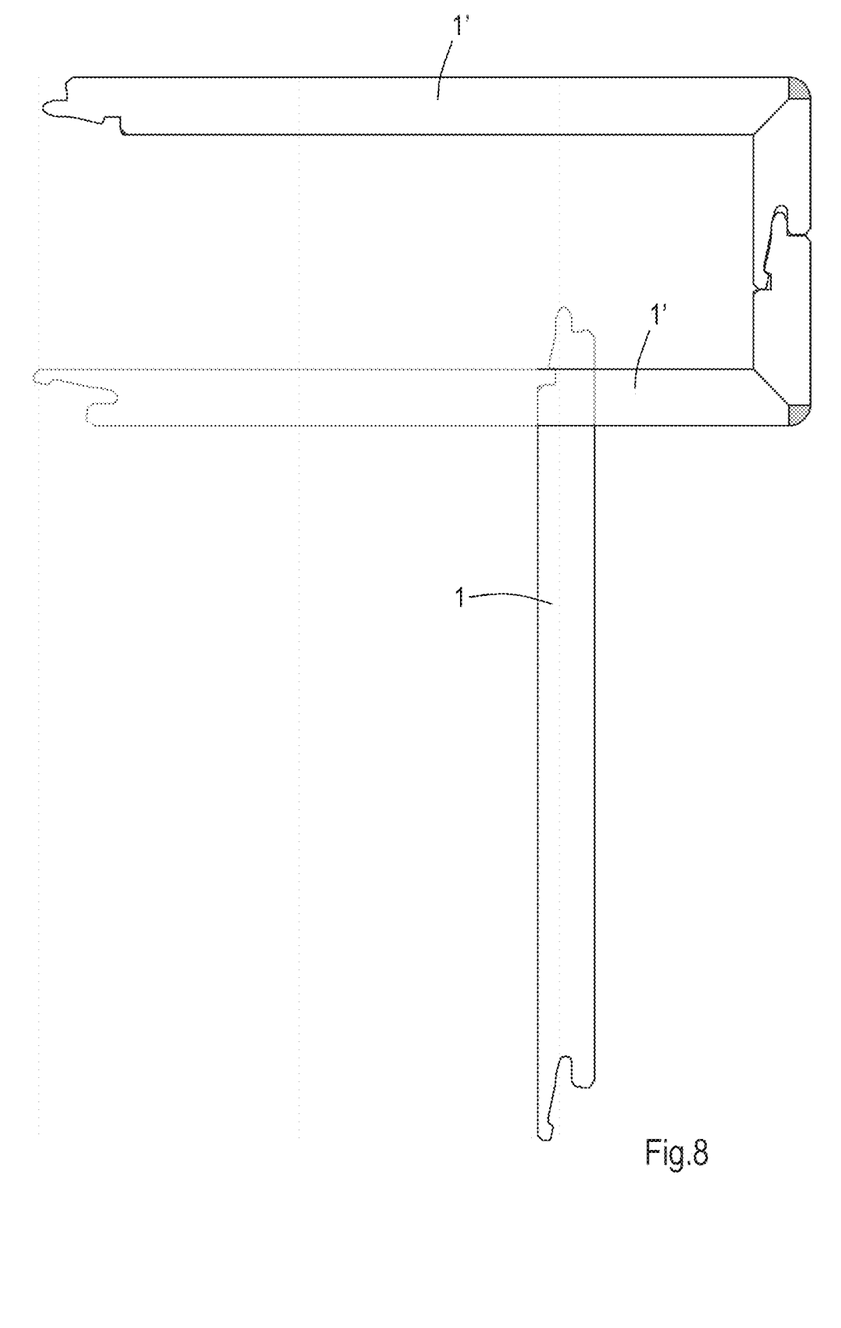

The resulting folded panels 1' can be used as stair covering or stair shells. FIG. 6-8 illustrate three possible stair coverings. In the embodiment according to FIG. 6 the folded panels 1' according to FIGS. 3 and 5 are combined. FIG. 7 shows an embodiment wherein the panel 1 according to FIG. 1 and the folded panel according to FIG. 3 are combined. In the embodiment according to FIG. 8 two folded panels 1' according to FIG. 3 and one panel 1 according to FIG. 1 are combined.

The invention is not limited to the embodiments illustrated in the drawing and described above, which may be varied in different ways within the context of the invention.

The invention claimed is:

1. A method for manufacturing a folded panel, comprising the following 10. steps:
   feeding a panel with a front side and a rear side,
   installing an elongated recess at the rear so that at the front between remaining panel sections a flexible transition section remains on both sides of the recess,
   bending the panel sections relative to each other to a folded condition with a desired curvature of the transition section,
   applying an adhesive in the recess in order to fix the folded condition,
   wherein, before the panel sections are bent relative to each other, a template is inserted into the recess, which template has an end face with a shape such that the transition section in the folded condition abuts the end face, and the transition section is bent around the end face while bending the panel sections, after which the template is removed and the panel so folded is held in the folded position and then the adhesive is applied.

2. The method according to claim 1, wherein the template has such a shape that outer sides of the template situated on both sides of the end face, in the folded condition abut the opposite side walls of the panel sections at the location of the recess.

3. The method according to claim 1, wherein the end face has a curvature with a constant radius.

4. The method according to claim 1, wherein the end face is located at a thickened part of the template.

5. The method according to claim 1, wherein in the folded condition the template is slid from the recess in the lengthwise direction of the recess.

6. The method according to claim 1, wherein the panel is provided with a core and
   wherein at the front side of the panel a top layer of a material other than the core is bonded to the core,
   wherein the transition section at least comprises the top layer.

7. The method according to claim 1, wherein opposite side edges of the panel are provided with coupling means for coupling the panel with a similar panel,
   wherein the recess is made parallel to the coupling means.

* * * * *

UNITED STATES PATENT AND TRADEMARK OFFICE
CERTIFICATE OF CORRECTION

| | | |
|---|---|---|
| PATENT NO. | : 12,194,655 B2 | Page 1 of 1 |
| APPLICATION NO. | : 17/778145 | |
| DATED | : January 14, 2025 | |
| INVENTOR(S) | : Mark Cappelle, Christophe Naeyaert and Ewan Demaegdt | |

It is certified that error appears in the above-identified patent and that said Letters Patent is hereby corrected as shown below:

In the Claims

Column 4, Line 12-13, Claim 1:
Delete:
"A method for manufacturing a folded panel, comprising the following 10. steps:"
Insert:
--A method for manufacturing a folded panel, comprising the following steps:--

Signed and Sealed this
Fourth Day of March, 2025

Coke Morgan Stewart
*Acting Director of the United States Patent and Trademark Office*